United States Patent [19]

Treat et al.

[11] Patent Number: 5,183,355
[45] Date of Patent: Feb. 2, 1993

[54] METHOD OF DRAINING WATER THROUGH A SOLID WASTE SITE WITHOUT LEACHING

[75] Inventors: Russell L. Treat; Glendon W. Gee; Greg A. Whyatt, all of Richland, Wash.

[73] Assignee: Battelle Memorial Institute, Richland, Wash.

[21] Appl. No.: 791,746

[22] Filed: Nov. 12, 1991

[51] Int. Cl.$^5$ .............................................. B09B 5/00
[52] U.S. Cl. ...................................... 405/128; 405/50; 405/52
[58] Field of Search ....................... 405/36, 43, 50, 52, 405/53, 55, 128, 129

[56] References Cited

U.S. PATENT DOCUMENTS

| | | | |
|---|---|---|---|
| 3,516,568 | 6/1970 | Fish | 405/55 X |
| 4,678,369 | 7/1987 | Glaser | 405/129 |
| 4,697,954 | 10/1987 | Grund | 405/128 |
| 4,753,551 | 6/1988 | Brueggemann et al. | 405/128 |
| 5,078,543 | 1/1992 | Terrel | 405/128 |

*Primary Examiner*—David H. Corbin
*Attorney, Agent, or Firm*—Paul W. Zimmerman

[57] ABSTRACT

The present invention is a method of preventing water from leaching solid waste sites by preventing atmospheric precipitation from contacting waste as the water flows through a solid waste site. The method comprises placing at least one drain hole through the solid waste site. The drain hole is seated to prevent waste material from entering the drain hole, and the solid waste site cover material is layered and graded to direct water to flow toward the drain hole and to soil beneath the waste site.

19 Claims, 2 Drawing Sheets

METHOD OF DRAINING WATER THROUGH A SOLID WASTE SITE WITHOUT LEACHING

This invention was made with Government support under Contract DE-AC06-76RLO 1830 awarded by the U.S. Department of Energy. The Government has certain rights in the invention.

FIELD OF THE INVENTION

The present invention relates generally to a method to allow water to drain or percolate through solid waste disposal sites without leaching the waste. More specifically, the invention relates to placing drain holes through a solid waste site and directing water to the drains by layering and sloping cover materials.

BACKGROUND OF THE INVENTION

The objective of waste disposal sites is to maintain acceptable limits of migration of waste material from the site into other zones including but not limited to groundwater and the atmosphere. There are many mechanisms of waste material migration including but not limited to leaching, surface runoff, gas migration, and biotic uptake. The focus of the present invention and many previous inventions is directed toward controlling leaching.

As used herein, leaching is defined as water flowing through a waste site, dissolving waste constituents, and carrying the dissolved waste constituents beyond the waste site. The amount of leaching that occurs at a particular waste site depends directly on the amount of water flowing through the waste site. Maximum leaching occurs when the site is evenly infiltrated by either a high rate of inflowing atmospheric precipitation such as rain or snow, or by exposure to groundwater flow from an aquifer.

As used herein, waste sites may be characterized as having solid, liquid or a combination of wastes. Solid waste includes but is not limited to municipal refuse, industrial scrap, process wastes, medical waste, nuclear waste, and chemical wastes. Liquid waste includes but is not limited to polluted ponds and lakes.

Most waste sites are solid waste sites located above groundwater aquifers and infiltration of atmospheric precipitation is the main source of water flow through most solid waste sites. Hence, past efforts as well as the present invention are directed toward controlling the amount of leaching due to atmospheric precipitation through solid waste sites.

Past efforts to control leaching tend to fall into four groups, (1) allowing water to flow through a waste site then collecting and disposing the leachate; (2) sealing a waste site and allowing water to flow into the site and accumulate and relying on evaporation to prevent saturation; (3) preventing water from entering a waste site; and (4) preventing water from flowing through a waste site.

Controlling leaching by allowing water flow through a waste site then collecting and disposing the leachate is the subject of several prior patents, of which, the following may be considered representative.

U.S. Pat. No. 3,586,624 to Larson discloses a landfill having an earth sub-base covered with a liquid impervious layer. A first layer of waste is placed on top of the liquid impervious layer and leachate is drained from the landfill and treated. When the first layer of waste is full, it is covered with a liquid impervious layer and the process repeated.

U.S. Pat. No. 4,352,601 to Valiga et al., discloses temporary storage of waste in a bin having a water impervious liner and substantially water impermeable cover for the water impervious liner, and a collection sump outside a perimeter wall of the bin.

U.S. Pat. No. 4,358,221 to Wickberg, teaches a liquid impermeable enclosure with concrete walls. The concrete walls have a plurality of vertical bores filled with sand for the purpose of wicking leachate to gravel filled windrows directing the leachate to a collection pit.

U.S. Pat. No. 4,624,604 to Wagner et al., shows a dual compartment system. The first compartment for receiving waste material is lined with a liquid impermeable flexible liner. The sides of the first compartment are sloped to direct water to a second compartment below the first compartment. The water is treated with a plurality of treatment materials in the second compartment then collected for subsequent treatment and disposal.

German patent 3,445,127 laid open Jun. 19, 1986 granted to Meier discloses a bottom structure for rubbish dumps comprising a catacomb-like structure of arches and columns which support a sealed waste site foundation. The columns or pillars are hollow for collecting leachate that is discharged to a cleaning system.

In addition to methods directed toward leachate collection, German patent 3,502,980 to Anonymous, laid open Jul. 31, 1986, is directed toward complete sealing of the foundation of reservoirs and waste dumps with no provision for removal of leachate. The seal comprises two barrier layers and an intervening permeable layer. In the case of a leak, leachate is collected in the permeable layer and disposed of. The leak is, however, repaired so that normal operation of the foundation is impermeable.

Another approach is to prevent water from entering the waste thereby preventing the formation of leachate. U.S. Pat. No. 4,483,641 to Stoll teaches a means for shedding and evaporating water before it reaches the waste. This is accomplished by covering the waste with a substantially impermeable material such as clay and shaping the clay so that water is directed away from the waste. In addition, below the clay is a ventilation layer comprising graded rock. Open standpipes penetrate the clay to the ventilation layer allowing air to flow through the ventilation layer to evaporate any moisture that seeps through the clay cover.

Yet another approach is to prevent flow through the leachate. U.S. Pat. No. 4,580,925 to Matich et al. discloses a waste landfill having a porous layer surrounding the waste to permit groundwater to flow within the porous layer and reduce the hydraulic gradient across the disposal zone thereby reducing seepage.

U.S. Pat. No. 4,618,284 to Marks is directed toward a waste vault comprising an impervious cover directing water to a gravel filled moat on the perimeter of the waste vault. The clean water in the moat exerts a radial pressure to prevent water within the waste vault from spreading to the surrounding area.

Whether leaching control is achieved by (1) collecting the leachate, (2) accumulating leachate, (3) preventing water entry into a waste site, or (4) preventing water flow through a waste site, most of the methods are applicable to new waste sites, but because the prior methods rely on sealing underneath the waste site, they would be unsuitable for controlling leaching through an existing unsealed waste site. Only one (U.S. Pat. No.

4,618,284) does not rely on sealing beneath the waste site. However, '284 is designed for isolating liquid waste such as a polluted lake or marsh containing a significant amount of water exerting significant hydraulic pressure.

It would be advantageous to have available a method of controlling leachate through a solid waste site that can be applied to an existing waste site without a bottom seal. It would be further advantageous to allow precipitation to flow without needing subsequent collection or disposal.

SUMMARY OF THE INVENTION

The present invention is a method of preventing leaching of solid waste sites. The method comprises placing at least one drain hole through the solid waste site. The drain hole is sealed to prevent waste material from entering the drain hole, and the solid waste site cover material is layered and graded over the waste site to direct water to flow toward the drain hole. Water is prevented from forming leachate and may be allowed to flow into the soil beneath the waste site.

Making a drain hole may be accomplished in two steps. The first step comprises inserting a pipe into a hole drilled through the waste site, then filling an annulus between the outside diameter of the pipe and the diameter of the drilled hole with a diffusion-limiting material. The second step comprises filling the center of the pipe with hydraulically conductive material.

Directing the water toward a drain hole is accomplished by placing and sloping three layers of material above the solid waste. The first layer is a diffusion-limiting material, the second layer is a wick material, and the third layer is a substantially water impermeable material.

A standpipe extending through the material layers and into the center of the drain hole may be added to drain water that collects in the low points of the sloped substantially water impermeable material.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The present invention is a method of preventing leaching of solid waste sites by preventing water of atmospheric precipitation from contacting waste as it flows through a solid waste site. The method comprises placing at least one drain hole through the solid waste site. The drain hole is sealed to prevent waste material or moisture from the waste from entering the drain hole, and solid waste site cover material is layered and graded to direct water to flow toward the drain hole.

Figure 1:
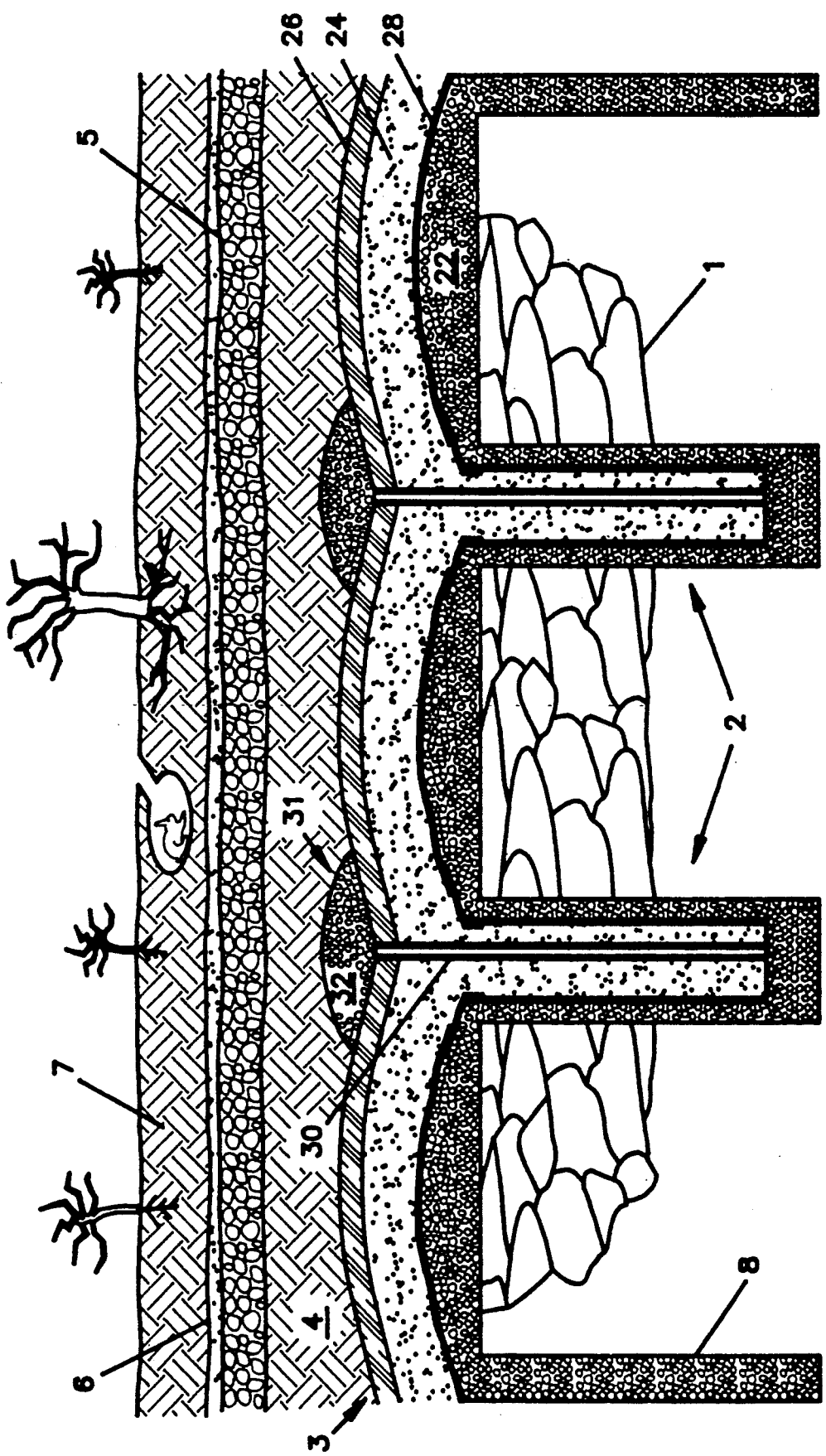
FIG. 1 is a schematic cross section of a waste site having drain holes with layered and sloped cover material.

A waste site may require stabilization to prevent collapse of the waste by subsidence when a drain hole is drilled. For example, compaction or grout injection may be used to allow construction of drain holes. FIG. 1 illustrates a solid waste site (1) with drain holes (2) and having a sloped and layered cover (3). The cover (3) may be buried with a leveling layer (4) of soil. In addition, the cover (3) may be protected against plant roots and burrowing animals by a first protective layer (5) of stones or cobbles. The cobbles are sized to discourage burrowing by indigenous animals. A second protective layer (6) of washed sand or other hydraulically conductive material above the first protective layer (5) prevents loss of soil from a soil layer (7) into the interstices between the cobbles. A trench (8) filled with washed gravel surrounds the solid waste site (1) thereby preventing lateral flow of water into the solid waste site (1).

The first protective layer (5) of cobbles, together with the second protective layer of washed sand (6) provide a capillary barrier for preventing unsaturated flow from the surface to the waste site (1). The capillary barrier permits water to be removed from the soil layer (7) by evaporation and evapotranspiration of live plants, thereby preventing or reducing the amount of water entering into the drain holes (2).

Figure 2:
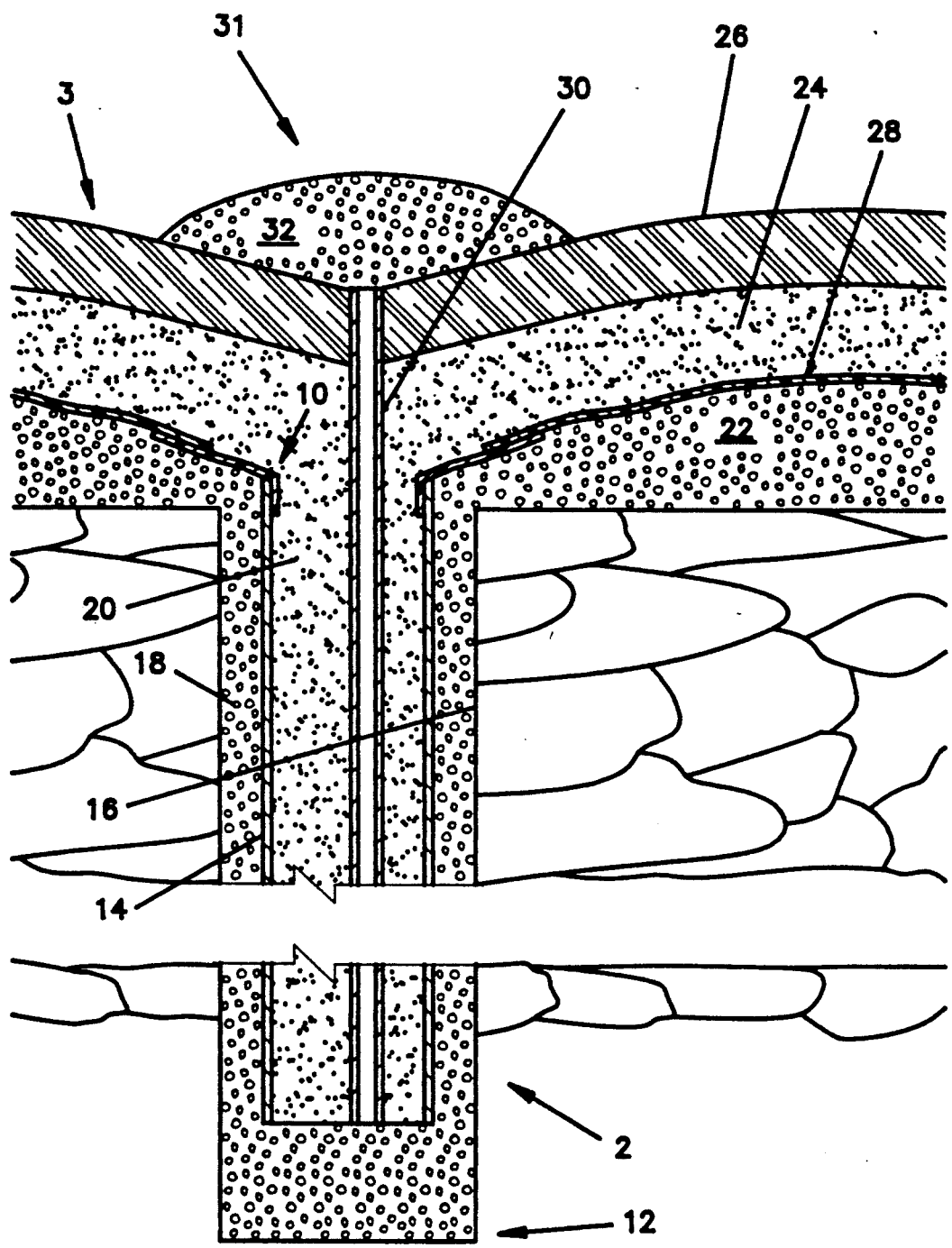
FIG. 2 is a detailed cross section of a single drain hole.

FIG. 2 illustrates the details of the drain hole (2) and the cover (3). Both the drain hole (2) and the cover (3) are water permeable in a first direction and substantially water impermeable in a second direction perpendicular to the first direction. In the drain hole (2), the perimeter of the drain hole (2) is sealed preventing water flow from or to surrounding waste, and the center is hydraulically conductive allowing water to flow through the center. In the cover (3), the top and bottom are sealed while the center is hydraulically conductive to allow water to flow toward drain holes (2) either on the sealed top or through the conductive center if the sealed top is breached.

The drain hole (2) extends from a first position (10) near the top of the solid waste site (1) to a second position (12) substantially below the solid waste site (12). It is preferred that the second position (12) is at least about 2 meters (6 ft) below the bottom of the waste site, and at least about 1 meter (3 ft) above any underground aquifer.

Making a drain hole (2) is accomplished in two steps. The first step comprises inserting a pipe (14) into a drilled hole (16) and filling the annulus defined by the outside diameter of the pipe (14) and the diameter of the drilled hole (16) with a diffusion limiting material (18) that may include but is not limited to grout, asphalt coated gravel, or bentonite clay. The second step comprises filling the center of the pipe (14) with hydraulically conductive material (20).

The diffusion limiting material (18) is utilized to prevent migration of moisture present in the waste site (1) into the drain holes (2). Dry bentonite clay is a preferred diffusion limiting material (18). If moisture enters the bentonite, it will swell and form a seal against further moisture intrusion. In addition, since it is underground, it is unlikely to shrink back to its unmoistened shape. Asphalt coated gravel is also a preferred diffusion limiting material (18) because it is hydrophobic and has a high diffusion resistance, and could be used instead of grout or bentonite. If liquid water contacts asphalt coated gravel, it will not wet the surface of the asphalt coated gravel and it will not develop a flow path in the absence of substantial pressure.

The pipe (14) serves two functions. It provides a form for the substantially water impermeable material (18)

and the hydraulically conductive material (20), and it is also a water barrier.

The hydraulically conductive material (20) is preferably a fine sand or sandy loam but may be diatamaceous earth.

Directing the water toward a drain hole (2) is accomplished with a sloped and layered cover (3). The first cover layer (22) is a diffusion-limiting material for holding moisture for release by evapotranspiration and may be, for example, asphalt coated gravel. The second cover layer (24) is a hydraulically conductive material preferably fine sandy loam for guiding water that penetrates the first cover layer (22) toward drain holes (2). The third cover layer (26) is a material of low permeability, for example, clay or asphalt for keeping water that enters the second cover layer (24) within it. A thin sheet (28) may be placed between the first cover layer (22) and the second cover layer (24). The thin sheet (28) is a filter mat material preferably a geotextile to stabilize the cover (3) by preventing grains of material from the second layer (24) from entering the first layer (22). In addition, the thin sheet (28) may be water impermeable to aid in directing water toward the drain hole (2).

A standpipe (30) extending through the cover (3) and into the center of the drain hole (2) may be added for draining water that may collect in the low points (31) of the cover (3). The top of the standpipe (30) is covered with a mound (32) comprising hydraulically conductive material, for example gravel. The mound (32) prevents clogging of the standpipe (30). The top of the standpipe (30) may be flush with the top surface of the third cover layer (26) as shown in FIGS. 1 and 2, or it may extend upwardly into the mound (32) having perforations near the top surface of the third cover layer (26).

In operation, when water is present in soil above a waste site, some of the water is detained in the soil by the capillary barrier comprising a first protective layer (5) and a second protective layer (6). Water that penetrates the capillary barrier encounters the low permeability third cover layer (26) which directs water toward drain holes (2). In the event that water penetrates the third cover layer (26), by reason of cracking, or by entry from the side, or any other reason, it enters the second cover layer (24) which is water permeable and sloped toward the drain holes (2). A first cover layer (22) is similar to the capillary barrier to prevent water from the second cover layer (24) from entering the waste site. Water flowing to the drain holes (2) does not contact the waste (1) thereby remaining clean and flows through the drain holes (2) to soil beneath the waste (1).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of preventing leaching of solid waste sites having a top and a bottom, comprising:
    (a) placing at least one drain hole extending from a first portion near the top of the solid waste site, through the solid waste site, to a second position substantially below the solid waste site,
    (b) sealing the perimeter of each drain hole, and
    (c) directing percolating water toward each drain hole and beneath the solid waste site.

2. A method as recited in claim 1, wherein sealing each drain hole comprises:
    (a) placing a pipe having an outside diameter smaller than the diameter of a drilled hole, and forming an annulus between the pipe and the drilled hole,
    (b) filling the annulus with a diffusion-limiting material.

3. A method as recited in claim 2, wherein the diffusion-limiting material is selected from the group of asphalt, asphalt coated gravel, bentonite clay and grout.

4. A method as recited in claim 2, wherein the hydraulically conductive material is selected from the group of fine sand, fine sandy loam, and diatamaceous earth.

5. A method as recited in claim 1, wherein directing percolating water comprises:
    providing a cover sloped toward each drain hole.

6. A method as recited in claim 2, further comprising:
    placing a standpipe through the drain hole, said standpipe having first and second ends, said first end extending upwardly to a top of the cover and said second end extending downwardly through the center of the pipe.

7. A method as recited in claim 5, wherein providing a cover comprises:
    (a) placing a first cover layer of diffusion-limiting material above solid waste in the solid waste site,
    (b) placing a second cover layer of hydraulically conductive material above the first cover layer,
    (c) placing a third cover layer of low water permeability above the second cover layer, and
    (d) sloping the three cover layers toward each drain hole.

8. A method as recited in claim 7, wherein the diffusion-limiting material is selected from the group of asphalt, asphalt coated gravel, clay, and grout.

9. A method as recited in claim 7, wherein the hydraulically conductive material is selected from the group of fine sand, fine sandy loam, and diatamaceous earth.

10. A method as recited in claim 7, wherein the third cover layer comprises clay.

11. A method as recited in claim 7, further comprising:
    providing a capillary barrier above the cover.

12. A solid waste site having a top and bottom, said solid waste site protected from leaching, comprising:
    (a) at least one drain hole extending from a first position near the top of the solid waste site, through the solid waste site, to a second position substantially below the solid waste site, and
    (b) a cover which is water permeable in a first direction and substantially water impermeable in a second direction perpendicular to the second direction, said cover being sloped toward said drain hole.

13. A solid waste site as recited in claim 12, wherein the drain hole comprises:
    (a) a hole drilled through a waste site,
    (b) a pipe having an outside diameter smaller than the diameter of the drilled hole placed within the drilled hole and forming an annulus between the pipe and the drilled hole,
    (c) a diffusion-limiting material placed in the annulus, and
    (d) hydraulically conductive material placed within the pipe.

14. A solid waste site as recited in claim 13, wherein the diffusion-limiting material is selected from the group asphalt, asphalt coated gravel, bentonite clay, and grout.

15. A solid waste site as recited in claim 13, wherein the hydraulically conductive material is selected from the group of fine sand, fine sandy loam, and diatamaceous earth.

16. A solid waste site as recited in claim 12, wherein the cover comprises:
  (a) a first cover layer of diffusion-limiting material above the solid waste,
  (b) a second cover layer of wicking material above the first layer, and
  (c) a third cover layer of substantially fluid impermeable material above the second layer.

17. A solid waste site as recited in claim 16, wherein the wicking material is selected from the group of sand, fine sandy loam, and diatamaceous earth.

18. A solid waste site as recited in claim 16, wherein the fluid impermeable material comprises clay.

19. A solid waste site as recited in claim 16, further comprising:
  a capillary barrier above the cover.

* * * * *

UNITED STATES PATENT AND TRADEMARK OFFICE
CERTIFICATE OF CORRECTION

PATENT NO. : 5,183,355
DATED : February 2, 1993
INVENTOR(S) : Russell Treat, et al.

It is certified that error appears in the above-indentified patent and that said Letters Patent is hereby corrected as shown below:

Column 5, claim 1, line 63, step (a), "first portion" should read --first position--.

Signed and Sealed this

Fifth Day of April, 1994

*Attest:*

BRUCE LEHMAN

*Attesting Officer*     *Commissioner of Patents and Trademarks*